US009346315B2

(12) United States Patent
Powell

(10) Patent No.: US 9,346,315 B2
(45) Date of Patent: May 24, 2016

(54) GAME BIRD DISPLAY DEVICE

(71) Applicant: Jeff Powell, Ashtabula, OH (US)

(72) Inventor: Jeff Powell, Ashtabula, OH (US)

( * ) Notice: Subject to any disclaimer, the term of this patent is extended or adjusted under 35 U.S.C. 154(b) by 0 days.

(21) Appl. No.: 14/619,623

(22) Filed: Feb. 11, 2015

(65) Prior Publication Data

US 2015/0226373 A1 Aug. 13, 2015

Related U.S. Application Data

(60) Provisional application No. 61/938,399, filed on Feb. 11, 2014.

(51) Int. Cl.
*F16M 11/00* (2006.01)
*B44C 5/02* (2006.01)

(52) U.S. Cl.
CPC ............. *B44C 5/02* (2013.01); *Y10T 29/49826* (2015.01)

(58) Field of Classification Search
CPC .................................. F16M 13/02; B44C 5/02
USPC ............... 248/176.1, 276.1; 428/6, 16, 542.4, 428/913.3; 434/296; D11/137
See application file for complete search history.

(56) References Cited

U.S. PATENT DOCUMENTS 4,865,302 A * 9/1989 Armstrong ............. A63H 27/10 269/239
5,064,725 A * 11/1991 Acker ....................... B44C 5/02 428/16
5,437,935 A 8/1995 Fredeen
6,210,251 B1 * 4/2001 Primos ................ A01M 31/004 446/207
6,451,393 B1 * 9/2002 Ploetz ........................ B44C 5/00 224/103
8,168,305 B1 5/2012 Peterson
D706,672 S * 6/2014 Bray ............................ D11/158
2005/0081422 A1 * 4/2005 Bradford ............... A01M 31/06 43/2
2012/0042561 A1 2/2012 Bain
2012/0261361 A1 * 10/2012 Deland .................. G09B 23/36 211/13.1
2013/0134282 A1 * 5/2013 Negretti ................. A47B 23/04 248/450
2014/0153182 A1 * 6/2014 North .................... G06F 1/1632 361/679.41

* cited by examiner

*Primary Examiner* — Gwendolyn W. Baxter
(74) *Attorney, Agent, or Firm* — Daniel Boudwin; Global Intellectual Property Agency LLC

(57) ABSTRACT

A game bird display device is provided that is configured to display multiple portions of a game bird from a single assembly. The display device is particularly suited for turkey birds, and comprises a rear mounting portion and a front mounting portion in parallel and spaced relation. The rear mounting portion is configured to be supported by a wall surface, while the offset between the portions accommodates the base of a turkey tail fan therein. Fasteners secure the base of the tail fan between the portions. Along the base of one of the portions is a game bird spur support member. The member supports a pair of turkey spurs in opposing relationship. Below or behind the game bird spur support member is supported the beard of the turkey. The display device therefore supports the tail fan, beard, and spurs of a game bird in one assembly.

12 Claims, 3 Drawing Sheets

GAME BIRD DISPLAY DEVICE

CROSS REFERENCE TO RELATED APPLICATION

This application claims the benefit of U.S. Provisional Application No. 61/938,399 filed on Feb. 11, 2014. The above identified patent application is herein incorporated by reference in its entirety to provide continuity of disclosure.

BACKGROUND OF THE INVENTION

Field of the Invention

The present invention relates to displays and mounts for hunted game. More specifically, the present invention relates to a wall mount for displaying the tail feathers, the beard, and the spurs of a game bird.

It is common for hunters to display mementos of a prey animal that has been captured or killed after a hunt. These momentous often include keepsake photographs with the prey animal, a display for portions of the prey animal anatomy, and even full scale displays of the animal after being preparing and stuffing by a taxidermist. As it relates to game birds, each of these methods is popular. For certain game birds in particular, including wild turkeys, several specific portions of the prey animal's anatomy are more prize worthy and subject to display than others. These portions include the tail feathers, the turkey's beard, and portions of the turkey's legs.

The feathers on the tail of certain game birds can vary in size and vary in complexity. Turkey tail feathers, commonly referred to collectively as the turkey fan, include an array of different feather sizes and shapes. The scale and design of the turkey fan varies from one turkey to the next, but can be quite decorative. The large and ornate shape of the turkey fan makes display of the turkey fan attractive to most turkey hunters. Therefore, the present invention provides a wall mount for displaying turkey fans, as well as one that is configured to support a turkey beard and the spurs of the turkey's legs from the same mount assembly.

Male turkeys and other game birds include enlarged, rearward projections extending from their legs, which are known as the "spur" of the turkey leg. The spurs are pointed, bony protrusions that are functional for the turkey and a reliable measure of the male turkey's age. Therefore, elongated spurs are considered one of the most spectacular parts of a turkey. Unfortunately, most mounting plaques that support turkey fans do not provide a way to display the spurs.

To increase the display capabilities of typical game bird mounts, the present invention provides a wall mount that supports a game bird fan, a game bird beard, and a male game bird's spurs for display purposes. The fan is supported between a rear mount portion and a front mount portion, whereby the base of the fan is fastened therebetween. Below the front mount portion the beard and the spurs are supported. The beard is suspended from the base of the front mount portion, while the spurs are supported in lateral opposition to another from the base of the front mount portion. In this way, a hunter can display the decorative game bird fan in conjunction with other prized portions of a bird's anatomy. Specific reference herein will be given to turkey anatomy; however, it is desired to disclose a novel mounting assembly and method that is functional for game birds generally, as well as for turkeys specifically.

SUMMARY OF THE INVENTION

In view of the foregoing disadvantages inherent in the known types of game trophies and display devices now present in the prior art, the present invention provides a new game bird feather display that provides support for a game bird fan, a game bird beard, and male game bird spurs with a single assembly.

It is therefore an object of the present invention to provide a new and improved game bird display device that has all of the advantages of the prior art and none of the disadvantages.

It is another object of the present invention to provide a game bird display device that supports multiple portions of a game bird from a single mount assembly, whereby the tail fan, beard, and spurs of a turkey or similar bird can be supported.

Another object of the present invention is to provide a game bird display device that provides a stable support for an enlarged tail fan, whereby fasteners between a pair of mount portions secure the base of the tail fan as a front portion provides a decorative outer surface over the tail fan base and fasteners.

Yet another object of the present invention is to provide a game bird display device that supports the spurs of a male game bird in lateral opposition to one another along the base of the assembly, thereby displaying the age and spur length of the hunted game bird.

Another object of the present invention is to provide a game bird display device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
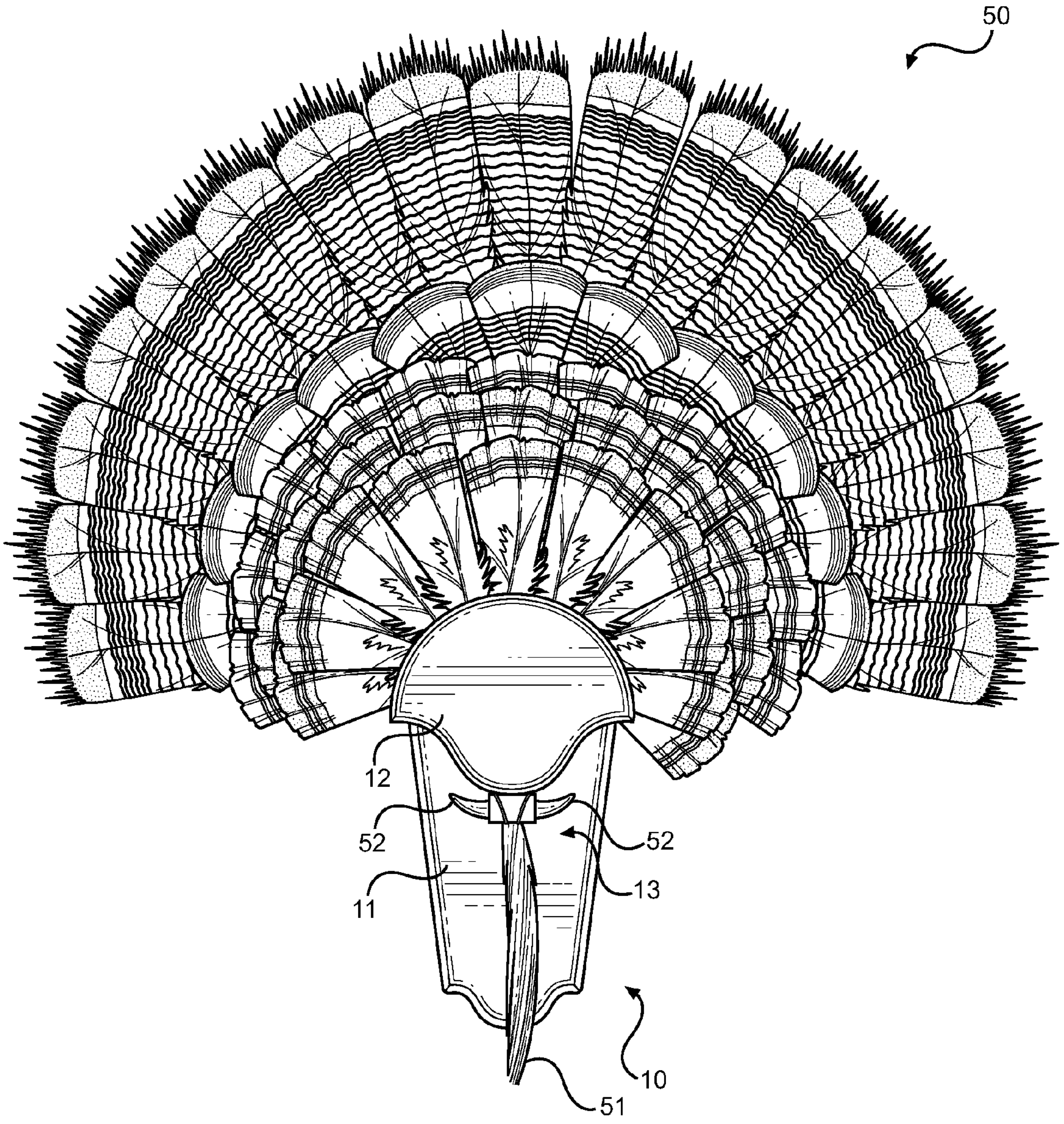
FIG. 1 shows a frontal view of the game bird display device of the present invention.

Reference is made herein to the attached drawings. Like reference numerals are used throughout the drawings to depict like or similar elements of the game bird mounting device of the present invention. For the purposes of presenting a brief and clear description of the present invention, the preferred embodiment will be discussed as used for displaying the tail fan, beard, and the spurs of a turkey therefrom. The figures are intended for representative purposes only and should not be considered to be limiting in any respect.

Referring now to FIG. 1, there is shown a frontal view of the game bird display device 10 of the present invention. The display device 10 comprises a front portion 12 affixed to a rear portion 11 in a spaced relationship, whereby the rear portion 11 is configured to be supported by a vertical wall surface. The front portion 12 is offset from the rear portion 11 and is connected thereto by an intermediate member at the base of the front portion 12. The offset between the portions is sized to receive the base of a game bird tail fan 50 therein, whereby the tail fan 50 is fastened within the offset and to the front 12 and rear 11 portions.

The exemplary embodiment of the present invention is one that is wall-mounted, whereby the rear portion 11 of the device is supported by fasteners along a vertical wall. Also contemplated are display mounts that support the rear portion 11 above a horizontal surface, as well as rear portion 11 designs that incorporate a widened base to support the assembly from a horizontal surface. For the interest of clarity, the preferred embodiment of the many contemplated will be discussed as being wall-mounted.

The front 12 and rear 11 portions of the display device 10 are offset from one another and support the base of the tail fan 50 such that the feathers thereof extend above the device 10 in a substantially radial pattern. The outer surface of the front portion 12 may further comprise a design or particular indicia thereon for decorative purposes. Disposed below the front portion 12 and secured thereto is a game bird spur support assembly 13 and an intermediate member that connects the front 12 and rear 11 portions together. The game bird spur support assembly 13 supports a pair of turkey spurs 52 in outwardly opposing relationship to one another, while the intermediate member is disposed rearward of the game bird spur support assembly 13 and supports a turkey beard 51 therefrom.

Turkey spurs 52 are elongated spikes that extend from the rear surfaces of a male turkey leg. These boney protrusions are cut from the legs such that the base of each spur 52 is substantially flat. The flat base of the spur 52 is positioned against the outer ends of the game bird spur support assembly 13 and glued thereto, whereby dowels can be extended through the base of each spur 52 to improve the adhesive connection. Once affixed to the game bird spur support assembly 13, the spurs 52 are disposed is outwardly opposing relationship to one another, whereby the tips of each spur 52 extend outwards, while the base surface of each are substantially parallel and inboard of the pointed tips thereof. Suspended below the game bird spur support member is the turkey beard 51, which are hair-like feathers grown along the chest of male turkeys.

Figure 2:
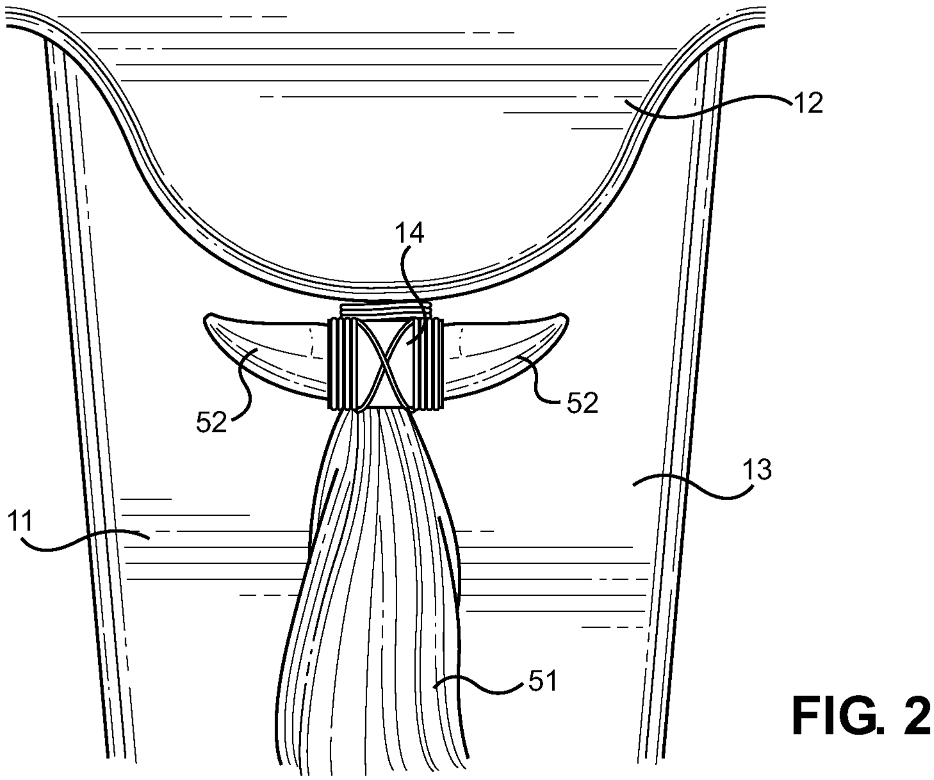
FIG. 2 shows a close-up view of the game bird spur mounting location of the present invention.
Figure 3:
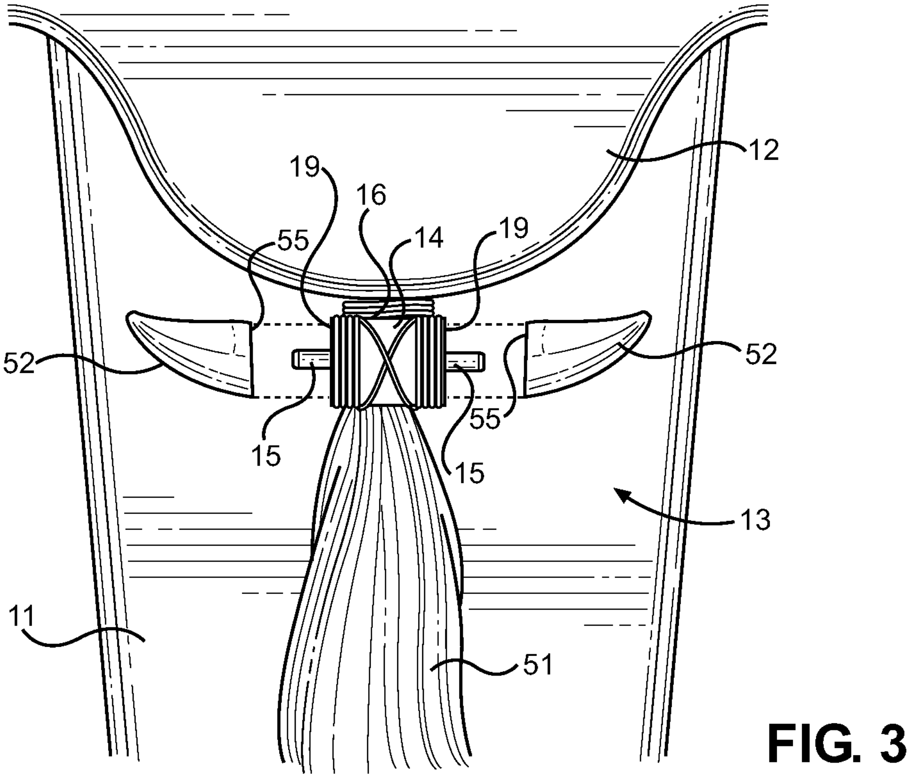
FIG. 3 shows a view of the spurs being mounted to the display device.

Referring to FIGS. 2 and 3, there are shown close-up views of the game bird spur support assembly 13 of the present invention at the base of the front display portion 12. The game bird spur support assembly 13 comprises a substantially rectangular member 14 affixed at its upper end 16 to the front portion 12 of the device. The outer ends 19 of the game bird spur support assembly 13 are substantially parallel and planar, wherefrom an optional dowel member 15 may extend to engage the base 55 of a turkey spur 52 secured thereto. The game bird spur support assembly 13 therefore supports a pair of turkey spurs 52 along its ends 16 by way of adhesive, such that the spurs 52 are outwardly opposed to one another and visible below the turkey tail fan.

Extending below the game bird spur support assembly 13 is the turkey beard 51. The turkey beard 51 affixes to the rectangular member 14 of the game bird spur support assembly 13, or alternatively the beard 51 affixes behind the rectangular member 14 and to the intermediate member between the front 12 and rear 11 display portions. The beard 51 is collected into a bundle at its upper end and secured to the display device using adhesive, whereby a majority of the beard length is exposed and suspended below the display front portion 12. The bundled upper end is directly glued to the display device, or is accepted into a cavity and glued to the interior surfaces of the cavity. In either embodiment, the beard 51 is disposed below the spurs 52 and is supported along its upper end.

Alternative methods of securing the spurs 52 and the beard 51 to the game bird spur support member 13 include lashing string around the rectangular member and portions of the beard 51 and spurs 52. The string is shown in FIGS. 2 and 3, extending around the rectangular member 14 and around the beard 51 and spurs 52. The upper end 16 of the rectangular member 14 is either permanent or removably affixed to the lower end of the frontal display portion 12.

Figure 4:
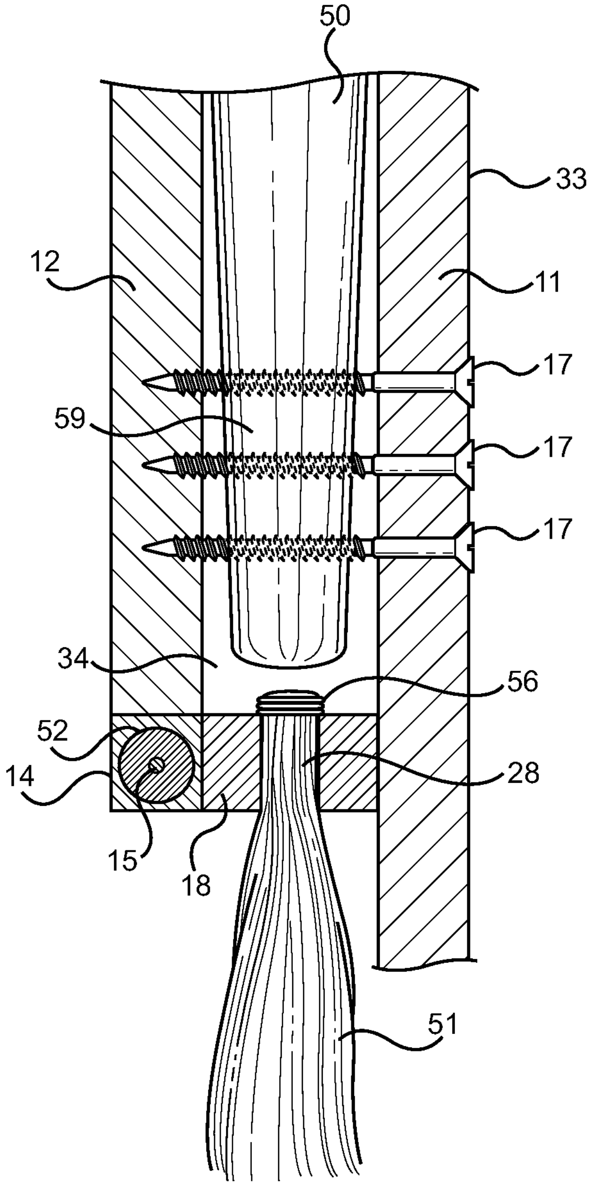
FIG. 4 shows a cross section view of the display device, whereby the tail fan fasteners are visualized.

Referring now to FIG. 4, there is shown a cross section view of the display device of the present invention, viewing the lower end of the device from one side. As shown, the rear portion 11 of the device is affixed to the front portion 12 of the device and offset therefrom by an intermediate connecting member 18 disposed therebetween. The tail fan 50 of the game bird is positioned within the offset 34 between the portions and is fastened therein using one or more fasteners 17 that extend through the portions and through the base 59 of the tail fan 50. The fasteners 17 extend through the rear surface 33 of the rear portion 11, through the base 59 of the tail fan 50, and then into the frontal portion 12. This configuration secures the tail fan 50 in location and within the offset. Alternative configures include fasteners of different style securing the base of the tail fan 50 to the device between the portions 11, 12.

Also shown in FIG. 4 is the connection of the turkey spurs 52 to the game bird spur support member 13. This connection is preferably an adhesive connection, assisted by a dowel 15 extending through the base of the spur. Between the front portion 12 and the rear portion 11 is the intermediate member 18, which connects the two in an offset condition. The intermediate member is preferably disposed behind the frontal portion 12 of the display, and is either behind the game bird spur support assembly 13, or disposed above the game bird spur support assembly 13.

The intermediate member 19 supports the turkey beard 51 therethrough. The connection between the beard 51 and the intermediate member 18 is one of an adhesive connection, string tied connection, or one in which the upper end 56 of the beard is bundled and disposed above a channel 28 extending through the intermediate member 18. The adhesive connection is one that adheres the upper end 56 of the beard 51 to the intermediate member 18, either directly to the lower surface thereof, or in conjunction with the channel 28 extending therethrough. The stringed connection is similar to the string connection visualized in FIGS. 2 and 3, whereby a length of string is lashed around the upper end 56 of the beard 51 and the upper end 56 is connected to the lower end of the game bird spur support assembly 13. Finally, the upper end 56 of the beard 51 may extend through the channel 28 and be bundled into a larger form, thereby allowing the beard 51 to extend through the channel 28 and suspended therefrom without the upper end 56 pulling through the channel 28. These and other attachment configurations are contemplated.

The present invention provides a device that is adapted for displaying a harvested game bird. In particular, the present invention is suited for supported and displaying a turkey fan, beard, and spurs in a singular display assembly. The radial fan is displayed above the device, the beard is suspended below the device, and the spurs are configured similarly to steer horn hood ornaments. That is, the spurs are oriented such that their pointed ends extend outward and away from one another along the lower portion of the display.

Overall, the device a decorative and aesthetically pleasing display of a game bird, and particularly a turkey fan, beard, and spurs a mount having a front portion and a rear portion. The front portion acts as a cover plate along the front of the turkey fan, and supports the spurs from a game bird spur support assembly 13. The beard extend down from the game bird spur support assembly or from the intermediate member connecting the front and rear portions of the device. The present invention is designed to provide a benefit for sportsmen, taxidermists, sporting goods stores, restaurants, bars, and other suitable places. The display device can be made from wood or another suitable material and can be offered in various sizes to accommodate user needs.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A game bird mounting device, comprising:

a rear portion and a front portion in an offset relationship and substantially parallel to one another;

an intermediate connecting member extending between said rear portion and said front portion, whereby the intermediate connecting member forms an offset between the rear portion and the front portion;

the front portion having a lower end;

a game bird spur support assembly disposed at the lower end of the front portion;

the game bird spur support assembly supporting a pair of game bird spurs therefrom;

the offset between the front portion and rear portion sized to receive a game bird tail fan therein; and fasteners securing the game bird tail fan within the offset.

2. The game bird mounting device of claim 1, wherein:

the game bird spur support assembly supports said pair of game bird spurs in outwardly opposing relationship, whereby each game bird spur comprises a tip and substantially planar base;

the planar base of said each game bird spur being connected to the game bird spur support assembly and the tip of said each game bird spur being disposed outwardly therefrom.

3. The game bird mounting device of claim 2, whereby:

said game bird spur support assembly has a pair of ends; and the pair of game bird spurs being secured to the ends of the game bird spur support assembly.

4. The game bird mounting device of claim 3, whereby said pair of game bird spurs are adhered to the ends.

5. The game bird mounting device of claim 3, whereby said pair of game bird spurs are adhered to the ends and supported by an internal dowel member.

6. The game bird mounting device of claim 3, whereby said pair of game bird spurs are lashed to the ends.

7. The game bird mounting device of claim 1, further comprising a game bird beard suspended below said front portion and in front of said rear portion.

8. The game bird mounting device of claim 7, wherein said game bird beard is supported by said intermediate connecting member.

9. The game bird mounting device of claim 7, wherein said game bird beard is supported by said game bird spur support assembly.

10. The game bird mounting device of claim 1, whereby the game bird spur support assembly further comprises a rectangular member.

11. A method of mounting a game bird, comprising steps of:

supporting a game bird tail fan between a rear portion and a front portion of a mounting device, whereby the front portion and rear portion are offset from one another;

fastening the game bird tail fan to the mounting device;

securing a pair of game bird spurs to the front portion of the mounting device such that the game bird spurs extend outward from one another; and suspending a game bird beard below said game bird spurs.

12. A method of mounting a game bird, comprising the steps of:

supporting a game bird tail fan between a rear portion and a front portion of a mounting device, whereby the front portion and rear portion are offset from one another;

fastening the game bird tail fan to the mounting device; and securing a pair of game bird spurs to the front portion of the mounting device such that the game bird spurs extend outward from one another.

* * * * *